(12) United States Patent
Pivowar et al.

(10) Patent No.: US 8,082,223 B2
(45) Date of Patent: Dec. 20, 2011

(54) SYNCHRONIZATION OF COMPUTER DATABASES USING CACHING AGENTS

(75) Inventors: Alvin I. Pivowar, Camas, WA (US); Jayita Poddar, Sunnyvale, CA (US)

(73) Assignee: Access Co., Ltd., Tokyo (JP)

( * ) Notice: Subject to any disclaimer, the term of this patent is extended or adjusted under 35 U.S.C. 154(b) by 0 days.

(21) Appl. No.: 12/902,101

(22) Filed: Oct. 11, 2010

(65) Prior Publication Data

US 2011/0029486 A1    Feb. 3, 2011

Related U.S. Application Data

(63) Continuation of application No. 10/242,344, filed on Sep. 11, 2002, now Pat. No. 7,814,053, which is a continuation of application No. 10/159,688, filed on May 31, 2002, now Pat. No. 7,139,748.

(60) Provisional application No. 60/377,713, filed on May 2, 2002.

(51) Int. Cl.
*G06F 7/00* (2006.01)
*G06F 17/30* (2006.01)

(52) U.S. Cl. ........................ 707/612; 707/614

(58) Field of Classification Search .................. 707/612, 707/614, 999.204
See application file for complete search history.

(56) References Cited

U.S. PATENT DOCUMENTS

| | | | |
|---|---|---|---|
| 5,870,759 A | 2/1999 | Bauer et al. | 707/201 |
| 5,926,816 A | 7/1999 | Bauer et al. | 707/8 |
| 6,182,198 B1 * | 1/2001 | Hubis et al. | 711/162 |
| 6,295,541 B1 * | 9/2001 | Bodnar et al. | 1/1 |
| 6,330,568 B1 | 12/2001 | Boothby et al. | 707/201 |
| 6,401,104 B1 | 6/2002 | LaRue et al. | 707/203 |
| 6,449,622 B1 | 9/2002 | LaRue et al. | 707/201 |
| 6,477,545 B1 | 11/2002 | LaRue | 707/201 |
| 6,516,327 B1 * | 2/2003 | Zondervan et al. | 1/1 |
| 6,571,245 B2 | 5/2003 | Huang et al. | 707/10 |
| 6,611,849 B1 | 8/2003 | Raff et al. | 707/203 |
| 6,625,602 B1 | 9/2003 | Meredith et al. | 707/8 |
| 6,625,623 B1 | 9/2003 | Midgley et al. | 707/204 |
| 6,643,669 B1 | 11/2003 | Novak et al. | 707/201 |
| 2002/0156782 A1 | 10/2002 | Rubert | 707/9 |

* cited by examiner

*Primary Examiner* — Cam Truong
(74) *Attorney, Agent, or Firm* — Berry & Associates P.C.

(57) ABSTRACT

A method and system for synchronization of computer databases using caching agents. In one embodiment, information is accessed from a first database. The information is stored into a persistent store, which may be a permanent media, such as a magnetic disk. The information is retrieved from the persistent store. Such retrieval may be in close time proximity to the storing, or the retrieval may be at a substantially different time from the storing. The synchronization is completed by updating a second database with the information retrieved by the caching agent from the persistent store. As an advantageous result, synchronization of computer databases is more efficient due to an optimized storage format for the information as well as maximum bandwidth access. As a further beneficial result, if a database is not present at the time of synchronization, embodiments of the present invention may enable synchronization capabilities unavailable under the prior art.

12 Claims, 13 Drawing Sheets

SYNCHRONIZATION OF COMPUTER DATABASES USING CACHING AGENTS

CROSS REFERENCE TO RELATED APPLICATIONS

This application is a continuation application of application Ser. No. 10/242,344, entitled "SYNCHRONIZATION OF COMPUTER DATABASES USING CACHING AGENTS," filed Sep. 11, 2002, which claims the benefit of U.S. provisional application Ser. No. 60/377,713, entitled "SYSTEM AND METHOD FOR SYNCHRONIZING COMPUTER DATABASES," filed May 2, 2002, all assigned to the assignee of the present application. The subject matter in the above-identified co-pending and commonly owned applications is incorporated herein by reference.

Said application Ser. No. 10/242,344 is also a continuation-in-part application of application Ser. No. 10/159,688, entitled "N-WAY SYNCHRONIZATION OF COMPUTER DATABASES," now U.S. Pat. No. 7,139,748, which is hereby incorporated herein by reference in its entirety.

BACKGROUND OF THE INVENTION

1. Field of the Invention

Embodiments of the present invention relate to database design. More particularly, embodiments of the present invention provide a method and apparatus for synchronization of computer databases using caching agents.

2. Background Art

A database is generally a collection of related information stored in computer readable form. Databases are ubiquitous in modern life. Mobile phones often contain databases of recently and frequently called numbers. The world wide web is comprised of countless databases. Hand held computers are in large part valuable because of the databases they contain. In fact, the databases contained in most computers are far more valuable than the computer hardware itself.

In order to use this valuable information, people must have access to the information. This is frequently accomplished using different types of computers for different situations. For example, a salesman may create a spreadsheet containing pricing information on a desktop computer, and desire to access that information via a small hand held computer while at a customer's premises.

It is often difficult, expensive or impractical to actually access the same database from both types of computers, especially if one is operated in a mobile environment. To overcome this difficulty, a process of synchronizing databases was developed.

Synchronizing a database is generally a process by which a plurality of copies of a database is maintained such that the information in all copies is the same, or synchronized. The copies need not be bit for bit identical. A synchronization process can accommodate different file structure, operating system and data media requirements. The copies are frequently on different computer systems, but it is sometimes desirable to maintain separate, synchronized databases on the same computer system. Synchronization allows updates ("mutations") e.g., additions, deletions and/or changes made to one copy of a database, for example a copy on a hand held computer, to be reflected to all copies.

Prior art synchronization systems generally require all databases to "present," e.g., connected to the synchronization system at the same time, in order to be synchronized. As an unfortunate result, databases which are only occasionally connected to a synchronization system, e.g., a hand held computer, or databases which are connected via an intermittent or otherwise costly link, e.g., a wireless communications link, may be synchronized less often than is necessary or desirable. As an unfortunate consequence, information in the entire set of databases may be less up-to-date, and therefore less valuable, than if synchronization had occurred more frequently.

SUMMARY OF THE INVENTION

Accordingly, it would be advantageous to provide a method and system for synchronization of computer databases using caching agents. A further need exists for a method of synchronizing information among databases if some databases are not connected to a synchronization system when it is desirable to synchronize. A still further need exists for a method and system to increase the efficiency of synchronization.

Embodiments of the present invention provide a method and system for synchronization of computer databases using caching agents. Further embodiments provide a method of synchronizing information among databases if some databases are not connected to a synchronization system when it is desirable to synchronize. Yet other embodiments provide a method and system to increase the efficiency of synchronization.

A method and system for synchronization of computer databases using caching agents is disclosed. In one embodiment, information is accessed from a first database. The information is stored into a persistent store, which may be a permanent media, such as a magnetic disk. The information is retrieved from the persistent store. Such retrieval may be in close time proximity to the storing, or the retrieval may be at a substantially different time from the storing. The synchronization is completed by updating a second database with the information.

In another embodiment of the present invention, database information is retrieved from a single ended synchronization caching agent. This information is used to limit other information that is accessed from other databases. Information obtained from the caching agent and other databases is used to synchronize databases.

Another embodiment of the present invention provides for synchronization of a hand held computer using caching agents.

DETAILED DESCRIPTION OF THE INVENTION

Figure 1:
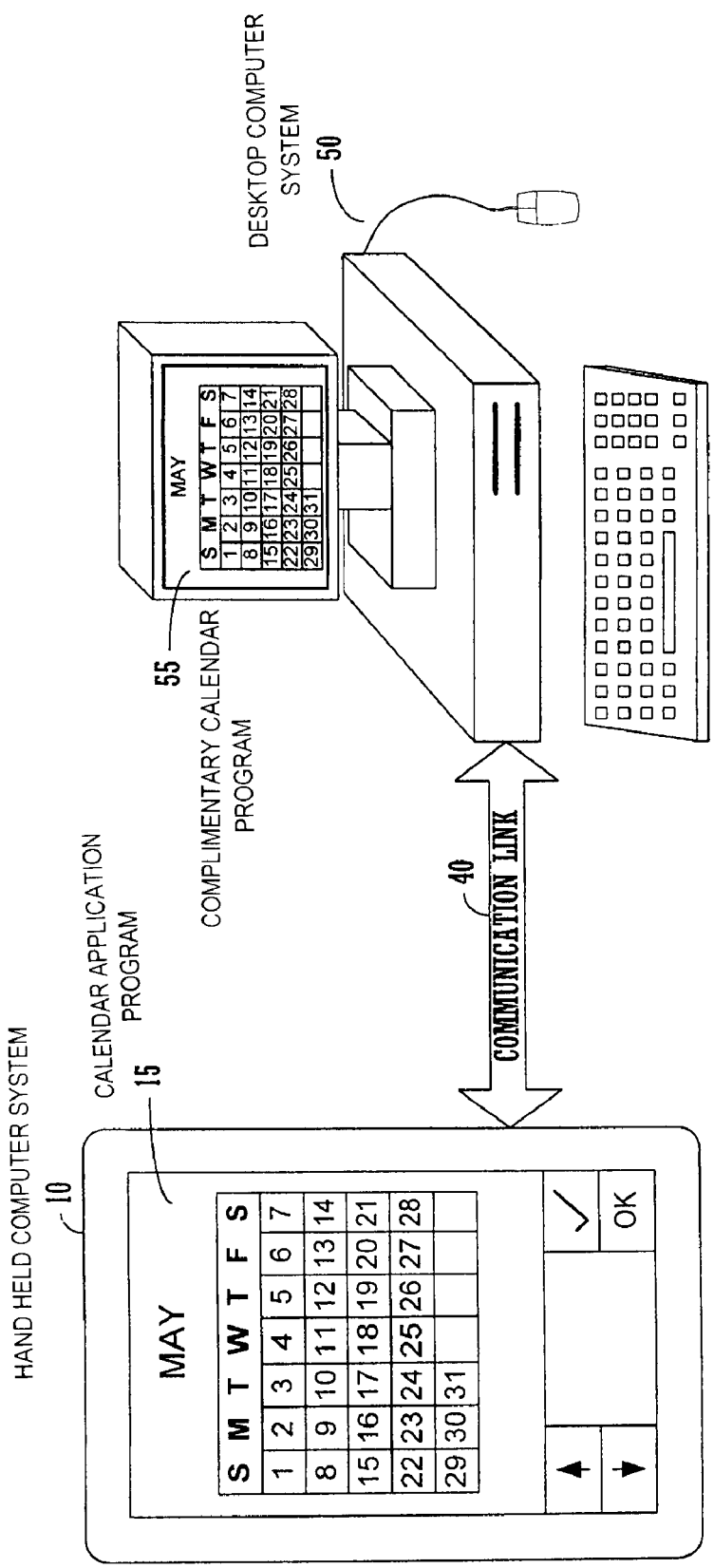
FIG. 1 illustrates a hand held computer system and a desk top computer that maintain synchronized databases, according to an embodiment of the present invention.

In the following detailed description of the present invention, synchronization of computer databases using caching agents, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions which follow (e.g., processes 300, 400, 700 and 800) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "indexing" or "processing" or "computing" or "translating" or "calculating" or "determining" or "scrolling" or "displaying" or "recognizing" or "generating" or "demarking" or "transferring" or "synchronizing" or "accessing" or "retrieving" or "conveying" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Synchronization of Computer Databases Using Caching Agents

U.S. Pat. No. 6,000,000, issued on Dec. 7, 1999 entitled "Extendible Method and Apparatus for Synchronizing Multiple Files on Two Different Computer Systems" and assigned to the assignee of the present invention is hereby incorporated herein by reference in its entirety.

Embodiments of the present invention are described in the context of a hand held computer system interacting with a desktop computer. However, it is appreciated that the present invention may be utilized in other types of computer systems, including embedded and distributed systems, where it may be necessary or desirable to synchronize the contents of computer readable information.

FIG. 1 illustrates a hand held computer system 10 and a desktop computer 50 that maintain synchronized databases, according to an embodiment of the present invention. It is appreciated that a wide variety of databases, resident on a variety of types of computer systems with various interconnections are well suited to embodiments of the present invention. Further, the synchronization of databases within the same computer is well suited to embodiments of the present invention.

Hand held computer system 10 is connected to desktop computer 50 through a communication link 40. Communication link 40 is often an asynchronous serial data link, for example RS-232. However, numerous wired and wireless communication links, including for example, infrared light, Bluetooth, IEEE 802.11 and universal serial bus (USB) are well suited to embodiments of the present invention. Communication link 40 allows the two computer systems to transfer information. In the example of FIG. 1, hand held computer system 10 is running a calendar (or date book) application program 15 and the desk top computer system 15 is running a complimentary calendar program 55. It is desirable for information entered into one program on one computer system, for example into calendar program 15 running on hand held computer 10, to be shared with another complimentary calendar program, for example calendar program 55 running on desk top computer system 50.

Synchronization is generally a process by which a plurality of copies of a database are maintained such that the information in all copies is the same, or synchronized. The copies need not be bit for bit identical. A synchronization process can accommodate different file structure, operating system and data media requirements. The copies are frequently on different computer systems, but it is sometimes desirable to maintain separate, synchronized databases on the same computer system. Synchronization allows modifications or updates ("mutations") of information, for example, additions, deletions and/or changes made to one copy of a database, for example a copy on a hand held computer, to be reflected to all copies.

These database copies are generally known as "endpoints." In some literature the term "farpoint" is used synonymously. An endpoint is generally a source or destination of records (individual data items) to be synchronized, e.g., a database, a communication channel, a device, etc. For example, it is commonplace to synchronize a desktop calendar system database with a calendar database on a hand held computer. In this example, the calendar database on the desktop computer is an endpoint, and the handheld calendar database is another endpoint. Endpoints are generally data structures in permanent, or semi-permanent computer memory, such as battery powered RAM in a hand held computer or magnetic media within a desktop computer. Endpoints may, however, be temporary, for example a buffer in a wireless data protocol stack.

Most synchronization systems, including that described in U.S. Pat. No. 6,000,000, use a "double headed" conduit program to synchronize information between two endpoints. A double headed or two-ended conduit program manages all aspects of synchronization, data retrieval and data storage between two endpoints. In addition, two ended conduits are typically constructed to synchronize between two specific endpoints. For example, a conduit may synchronize between a contact list (phone book) database on a hand held computer and a contact list database on a desktop computer. If an application developer desires to synchronize with a third endpoint, e.g., synchronize the desktop contact list with an email application on the desktop computer (e.g., to share email addresses), under the prior art it would be necessary to construct a new and separate conduit to synchronize these two (second and third) databases (endpoints).

Figure 2:
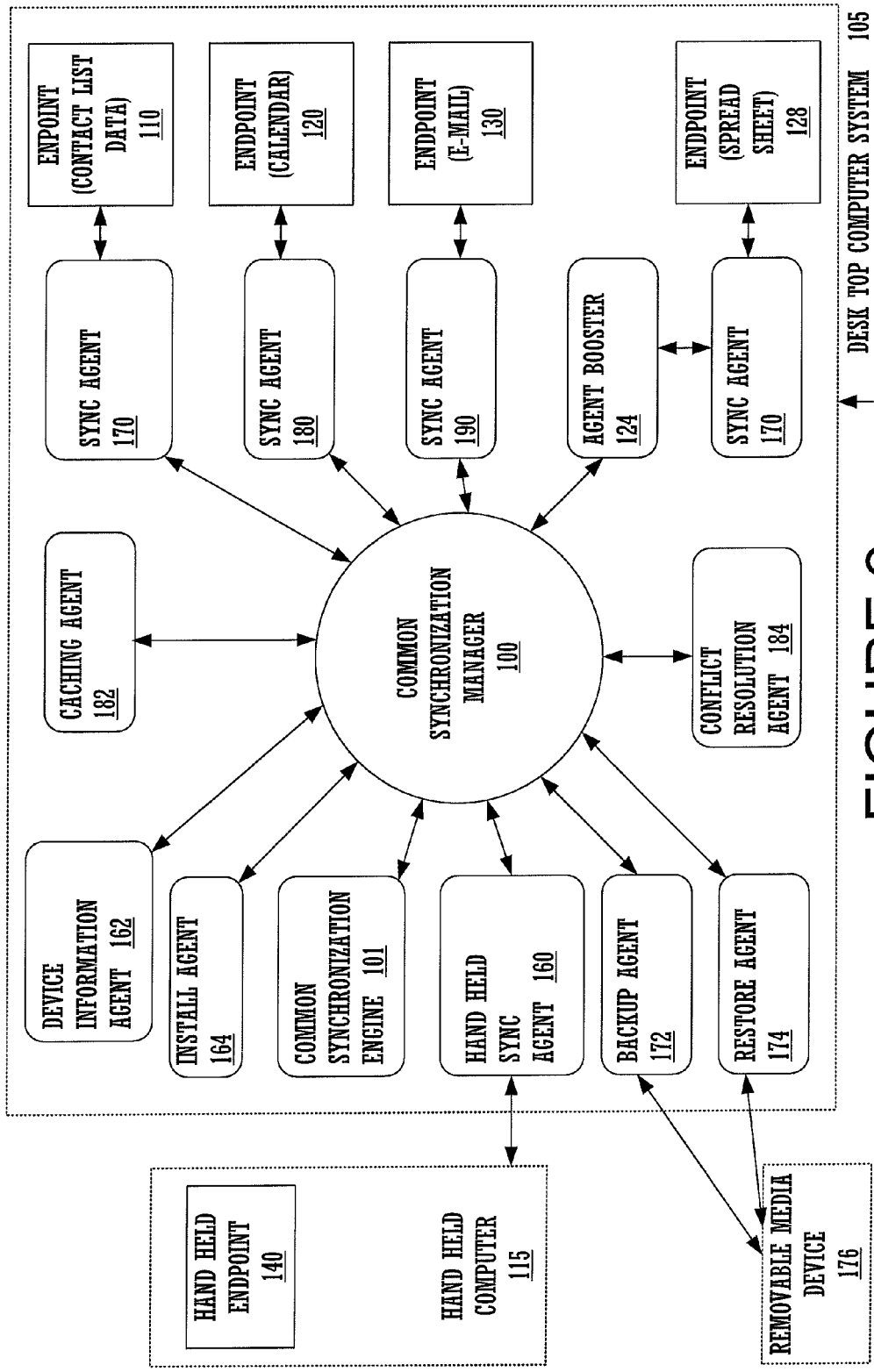
FIG. 2 illustrates a software block diagram of a novel synchronization system with single ended synchronization agents, according to an embodiment of the present invention.

FIG. 2 illustrates a software block diagram of a novel synchronization system with single ended synchronization agent programs, according to an embodiment of the present invention. It is to be appreciated that embodiments of the present invention may have greater or fewer elements of varying types than are illustrated in FIG. 2.

Desktop computer system 105 includes a plurality of synchronization ("sync") agents 125, 170, 180 and 190, a hand held synchronization agent 160, endpoints 110, 120, 128 and 130, and common synchronization manager 100. It is to be appreciated that the terms "agent," "engine" and "manager" as used herein refer to software modules designed to perform actions and methods described herein.

From the perspective of desktop computer system 105, hand held computer 115 comprises a single endpoint 140. It is appreciated that data stored in hand held computer 115 may be in a plurality of separate data structures.

According to an embodiment of the present invention, each synchronization agent communicates with a single endpoint. It is to be appreciated that a synchronization agent may communicate with other software modules, e.g., a synchronization manager software module, which generally do not represent a dataset nor are referred to as endpoints. For example, synchronization agent 170 communicates with endpoint 110, which is a contact list database. Likewise, hand held synchronization agent 160 communicates with hand held computer 115 as a single endpoint 140. It is appreciated that a wide variety of physical transport media are well suited to linking desk top computer system 105 with hand held computer 115, according to an embodiment of the present invention. Links may include, for example, asynchronous serial connections, universal serial bus (USB), ethernet, IEEE 802.11, Bluetooth, telephone lines and wide area wireless connections, e.g., CDPD, Mobitex and the like.

To perform a synchronization of data, for example, contact list data between a contact list database on desk top computer 105 and a phonebook database on hand held computer 115, common synchronization manager 100 is initiated. Common synchronization manager 100 requests information from synchronization agent 170 and hand held synchronization agent 160. A uniform communication protocol may be used between common synchronization manager 100 and the agents. Synchronization agent 170 accesses endpoint 110 that contains contact list data. Hand held synchronization agent 160 accesses hand held computer 115.

Synchronization agent 170 and hand held synchronization agent 160 provide requested information to common synchronization manager 100 that then provides the information to common synchronization engine 101. Generally on a record by record basis, common synchronization engine 101 will determine if the data in either endpoint, e.g., hand held endpoint 140 or endpoint 110 needs to be updated. If, for example, the contact information in hand held endpoint 140 has been updated, common synchronization engine 101 will send the updates to common synchronization manager 100 for forwarding to synchronization agent 170. Synchronization agent 170 will update the information in endpoint 110.

It is to be appreciated that synchronization may occur between any two or more synchronization agents, and that synchronization does not require hand held computer 115, according to an embodiment of the present invention. For example, an e-mail application may utilize e-mail database 130. Synchronization agent 190 may participate in the synchronization session described above in order to receive any updates to e-mail addresses entered into hand held endpoint 140 or contact list data 110. Alternatively, synchronization agent 190 may participate with synchronization agent 170 in a separate synchronization session and receive updates in this manner.

For example, assume that an e-mail address is changed on hand held computer 115. As previously described, hand held endpoint may synchronize with contact list database 110, via their associated single ended synchronization agents (160, 170) and common synchronization manager 100. At the end of that synchronization session, contact list data 110 is synchronized with the phone book database of hand held computer 115. In a subsequent synchronization session, without the participation of hand held computer 115, e-mail database 130 may be synchronized with contact list database 110. As a result of this second synchronization, e-mail database 130 receives the e-mail address previously updated on hand held computer 115.

It is to be appreciated that a synchronization manager need not be a single module residing on a single computing system, rather it may be distributed into multiple modules on one or more computing systems in accordance with an embodiment of the present invention. One method of distributing a synchronization manager across multiple systems is to use a synchronization manager on one system as an endpoint of a synchronization agent coupled to a sync manager on another system.

There are numerous advantages of a single ended synchronization agent when compared to the prior art. First, a single ended synchronization agent need only "understand" the data formatting and storage requirements of a single database. In contrast, the prior art double ended synchronization conduits were required to implement the data formatting and storage requirements of both databases, which were typically radically different, residing, for example, on different types of computers. Second, the single ended synchronization agent does not perform the critical reconciliation of data that is fundamental to synchronization. A common synchronization engine (e.g., common synchronization engine 101) performs this task. Further, most single ended synchronization software modules will not have to communicate with, or process data on a hand held computer. It is anticipated that manufacturers of hand held computers will provide a synchronization agent for these purposes. Even when there is no initial need to synchronize with other databases, the original developer of an application can facilitate later third-party enhancements by providing an initial (single ended) sync agent. In addition, a desirable feature of single ended synchronization agents is their modularity. As a result of such modularity, new data sources can be added independently, and no two agents access the same data source (endpoint) resulting in simplified change tracking.

With one common synchronization engine, all synchronization and reconciliation logic, including possible multiple methodologies, are common to all synchronization processing. Centralizing this function enables a single group of highly skilled practitioners to develop and maintain this critical software. In the prior art conduits, every conduit developer had to implement all synchronization logic and methodologies, resulting in widely divergent implementations of varying quality. In the prior art these numerous implementations often led to incompatibilities and malfunctions, resulting in poor user experiences and costly service calls. Such disruptions in synchronization may reflect poorly on hand held computer manufacturers, even though their provided hardware and software was not at fault.

A single ended synchronization agent moves data between its associated endpoint and a common synchronization manager. In order to accomplish this task, the synchronization agent is able to perform at least two functions. First, the synchronization agent is able to associate an object within the synchronization engine with a corresponding object in the agent's endpoint, and associate an object within the agent's endpoint with a corresponding object in the synchronization engine. These objects will typically be records of a database, for example contact list information for an individual.

Identification of objects is a rich field in the database arts, and it is to be appreciated that many methods of identifying objects are well suited to embodiments of the present invention. Objects may be identified with a global unique identifier, GUID. Objects in the endpoint generally may be identified in an application-dependent manner. It may be possible to use the endpoint's identifiers directly as GUIDs, but if the endpoint uses an incompatible system of identification, then a mapping should be maintained by the synchronization agent in order to match corresponding objects. The synchronization infrastructure may provide a persistent GUID mapping application programming interface, API, for synchronization agents to use.

A second function that is to be performed by a single ended synchronization agent is to deliver to a synchronization engine all data in the endpoint (e.g., database) that has changed since the last time a synchronization engine requested this same type of changed data. It is appreciated that a wide variety of methods may be used to identify objects that have changed in accordance with embodiments of the present invention. For example, one or more "dirty" bits may be set to indicate changes to an object and may be cleared after the object has been synchronized.

A "pedigree" is generally a record of change(s) of a database object, and may be used to indicate if an object has changed since a synchronization session. Co-pending, commonly owned U.S. patent application Ser. No. 10/159,461, filed May 31, 2002, entitled "Determining Priority Between Data Items" discloses a novel pedigree system that is well suited to embodiments of the present invention, and is hereby incorporated herein by reference in its entirety.

In order to describe some of the functions and methods used in embodiments of the present invention, the interchange of data between agents during a synchronization session is often modeled as a "tea party." The analogy is extended to include "inviting" synchronization agents to attend the parties. The parties usually have a "theme" which is generally understood to be a description of the type of information being synchronized, for example calendar information. Synchronizing multiple data types will typically involve scheduling multiple parties with differing themes, inviting agents interested in those themes and the like.

An agent (single ended synchronization agent program) is a software entity that wants to attend one or more tea parties and is prepared to behave appropriately. Every tea party has a "Tea Party Theme," for example, that indicates the type of information to be synchronized. Agents attend tea parties because they are interested in the theme of the tea party. For example, the agent is associated with (represents) a database that includes the particular type of data.

The purpose of a Tea Party is to potentially exchange information between databases. The agents at a tea party exchange information. A Tea Party happens in three rounds, namely the Agenda Round, Query Round, and Report Round.

Figure 3A:
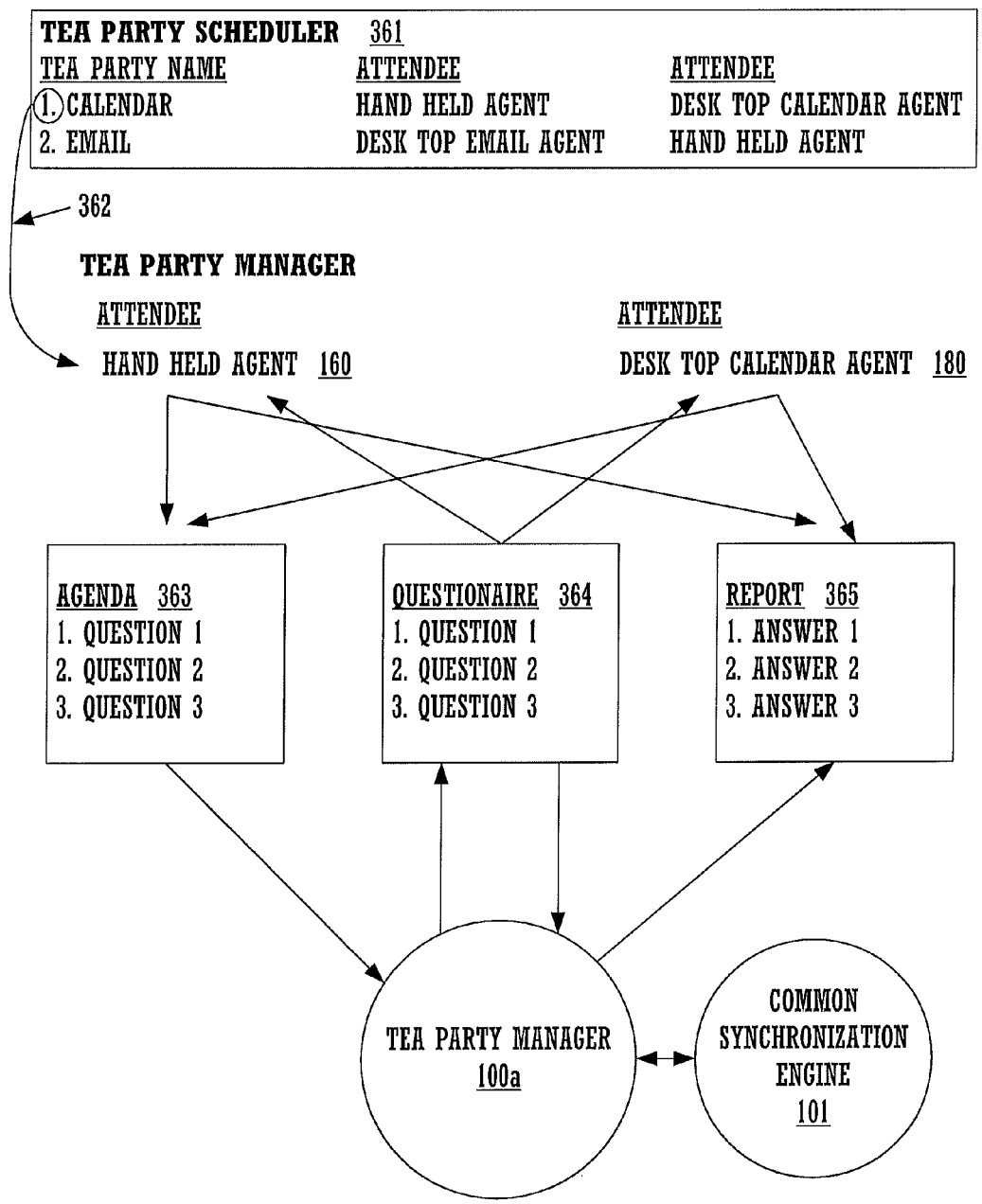
FIG. 3A depicts elements of a tea party and data flows associated therewith, according to an embodiment of the present invention.

FIG. 3A depicts elements of a tea party and data flows associated therewith, according to an embodiment of the present invention.

The Tea Party Scheduler 361 has a list 360 of Tea Parties and which agents wish to attend. For example, the first tea party on list 360 is labeled "calendar," and has a hand held agent and a desk top calendar agent as attendees. The Tea Party Scheduler operates by taking the first Tea Party on its list, in this case tea party 362 and giving it (sending the information) to the Tea Party Manager 100A software that operates the Tea Party. The tea party scheduler 361 and tea party manager 100A are components of the synchronization manager 100 described previously in FIG. 2.

A tea party consists of three rounds, an agenda round, a query round and a report round. The agenda round, e.g., agenda 363, determines what information will be exchanged during the party. This information is gathered during the query round and distributed to agents in the report round, e.g., report 365. The Tea Party Agenda 363 is a detailed list of questions assembled at the beginning of a Tea Party. It is used to later query agents. The Tea Party Report 365, produced during the Query Round, is the assembled answers to the questions on the agenda.

During the Agenda round of the tea party, the tea party manager presents each attending agent, e.g., hand held agent 160 and desktop calendar agent 180, with a questionnaire that contains two questions: "What questions do you have for the Agents at this party?" and "What kind of questions do you feel qualified to answer?" These questions typically are answered by statements of coverage. For example, "I am able to answer questions (provide information) up to a given coverage, and need information beyond that coverage."

In a Query round of a tea party, the tea party manager may present an attending agent with a custom questionnaire that contains one or more questions received from one or more other agents during the agenda round of the party. The tea party manager will only present a custom questionnaire to an agent if its response during the agenda round indicated expertise sufficient to answer all or part of the enclosed questions. The tea party manager presents the agents' Query questionnaire responses to the synchronization engine. The synchronization engine then synchronizes these responses.

A novel special type of synchronization agent is a caching agent, for example caching agent 182 of FIG. 2. Such an agent acts as an intermediary between a temporary working memory used by the Synchronization Engine (used for reconciliation during synchronization sessions) and a data structure in long term memory, for example a file on rotating magnetic media (not shown). Saving information to a long-term memory gives persistence to the results of sync parties. It is to be appreciated that a caching agent may also utilize characteristically volatile memory, e.g., RAM, if the memory is managed so as to retain information substantially permanently. For example, if a particular computer system is designed to remain always "on," or if RAM is automatically backed up to a disk upon power failure, then the data stored in RAM is substantially permanent, and such arrangements are well suited to embodiments of the present invention.

During a synchronization session, all of the agents associated with a data type typically attend that particular synchronization party. However, in practice a number of situations may arise in which all agents associated with a data type are not available. For example, a handheld computer may not be connected to a desktop computer, a central synchronization server may not be online, or a wireless connection may be dropped. Thus, because not all of the endpoints may be present, the corresponding agents may not be able to attend the party. These absent agents are of course not able to process the deltas for the current synchronization session, and later will have to "catch up." The data in the persistent cache of the caching agent allows these "tardy" agents to do just that, in accordance with embodiments of the present invention.

Figure 9A:
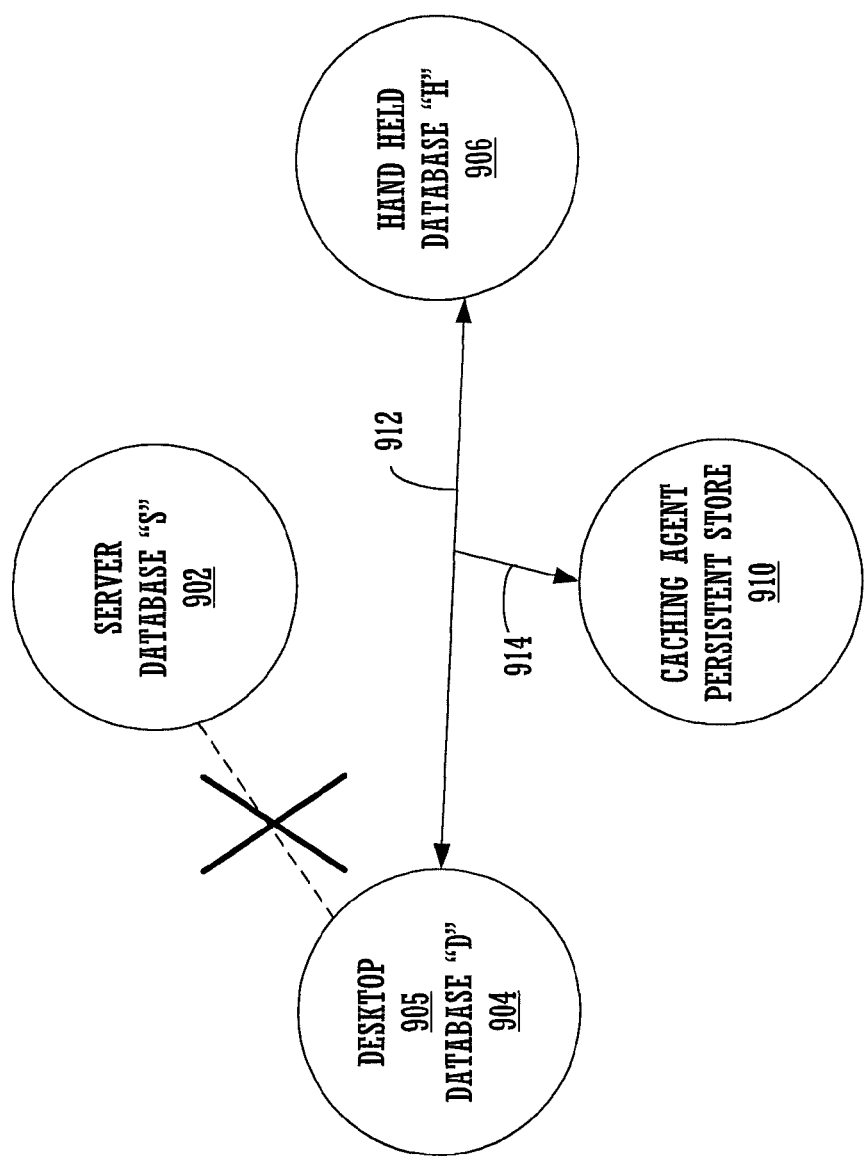
FIG. 9A illustrates an exemplary data flow, according to an embodiment of the present invention.

FIG. 9A illustrates an exemplary data flow, according to an embodiment of the present invention. Database "S" 902 is maintained on a remote sewer. Database "D" 904 is maintained on removable media on a desktop computer 905. Database "H" 906 is maintained on a hand held computer. The hand held computer and the desktop computer 905 may be connected together to synchronize their common databases at a point in time during which the desktop computer is unable to communicate with the server. Communication 912 represents the information interchange between database "H" 906 and database "D" 904, Intervening software modules and detailed communication paths, e.g., database synchronization agents or a synchronization manager, are not shown so as to more clearly illustrate the data flow. Caching agent 910 and its associated persistent store monitor communication 906 and store any new information via communication 914. In general, caching agent 906 monitors all synchronization communications and stores all new information. It is appreciated that, in general, communication 914 and 912 (further described below) are two way communications, They are illustrated herein as one way communications to more clearly illustrate aspects of the present example.

Figure 9B:
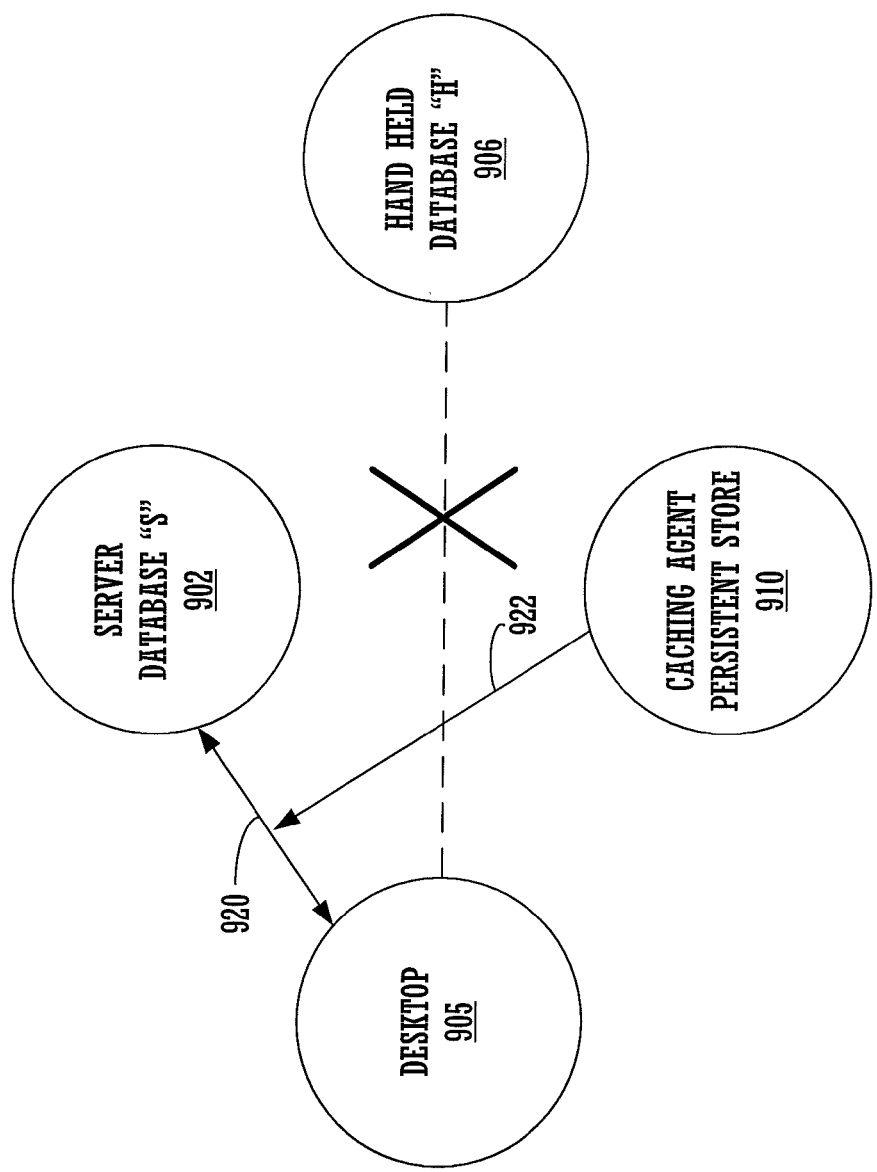
FIG. 9B illustrates an exemplary subsequent data flow, according to an embodiment of the present invention.

The desktop computer 905 and the hand held computer complete their synchronization such that database "D" 904 and database "H" 906 are synchronized. FIG. 9B illustrates an exemplary subsequent data flow, according to an embodiment of the present invention. At a later time when database "D 904 has been removed from desktop computer 905, desktop computer 905 and the server are able to communicate. Communication 920 illustrates the communication between database 902 and desktop 905. Since database "D" 904 is not present, database "H" can not receive updates directly from database "D" 904. However, due to the persistent store and caching agent 910, database "S" can be synchronized, even though neither database "D" 904 nor database "H" 906 are available. Communication 922 shows caching agent 910 supplying new information, including new information of database "D" 904 and new information of database "H" 906, to database "S" 902.

Preferably, the Caching Agent will attend all sync parties whose theme implies the reconciliation of data. The agent will read from the persistent store during the query round and will write out a new file during the report round. A caching agent attends, as guest, Tea Parties with themes organized around databases for which it is configured to provide caching. During the Agenda Round it asks "What's new with this database that 1 don't know?" and lists itself as an expert on the data it has in its cache. During the Query Round it will receive queries for data that it has in its cache. During the Report Round it will receive updates to add to its cache.

A way is provided for a set of coordinating agents to request that information from their databases not be cached. This is for agent developers that do not want to have a disk-based representation of the data, e.g., for security reasons.

Generally, a caching agent may store all answers received during a Query round in a cache, which may be temporary or permanent. The caching agent may, for example, "eavesdrop" or otherwise monitor the communications among databases, a synchronization engine and/or a synchronization manager.

The tea party manager presents each attending agent with a custom report containing answers to the questions posed by the agents (during the agenda round) in the query round. The tea party manager compiles this report by presenting each agent's agenda questions to the synchronization engine. The synchronization engine consults the local data cache it constructed during the query round to determine the available answers.

Consulting a persistent cache, or more particularly inquiring of a caching agent for answers, may lead to an increase in the efficiency of synchronization, even if a database comprising the same answers is presently available. In general, retrieval of information from a cache via a caching agent will be more efficient than retrieval of information from a database via the database's agent because the information is stored in the cache in a format optimized for use by the synchronization process. Typically, information stored in a database will be optimized for use by an associated database program and will require format conversion/translation by the associated agent prior to use by the synchronization system.

In addition, a data cache will generally be resident on the same computer that is executing the synchronization programs. Consequently, in general, information retrieved from the cache may be accessed via a high bandwidth, low latency path, for example a computer's main bus. In contrast, some databases may only be accessed via relatively slow communication channels, for example serial cables, as in the case of some hand held computers, or via wireless links. There may also be other costs associated with such communication channels, for example air time fees, making it more desirable to limit their use. As a beneficial result of the novel data cache and caching agent, such obstacles to synchronization are mitigated and the efficiency of synchronization is increased.

Figure 9C:
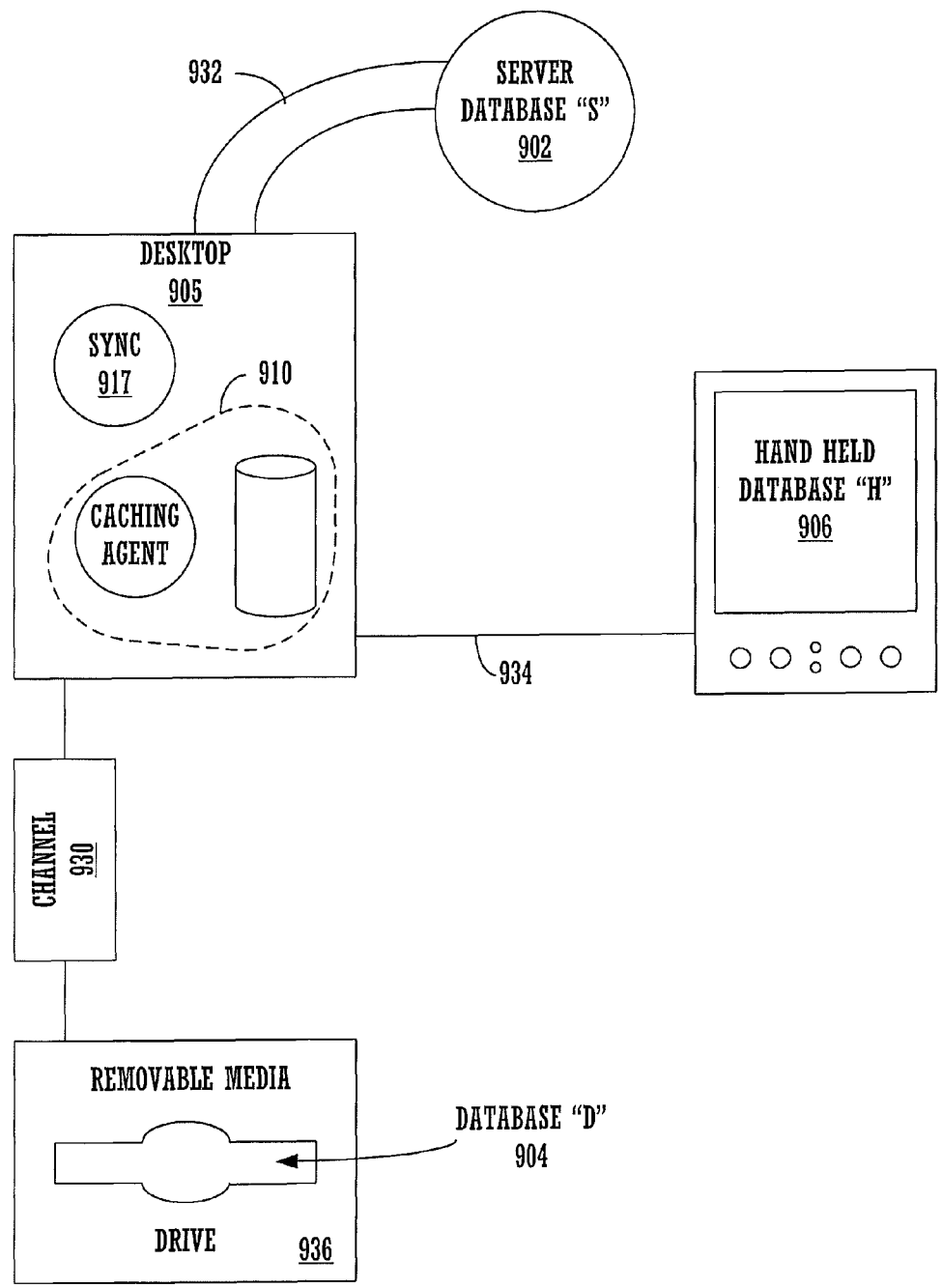
FIG. 9C illustrates exemplary synchronization efficiency improvements realized through the use of a caching agent, according to an embodiment of the present invention.

FIG. 9C illustrates exemplary synchronization efficiency improvements realized through the use of a caching agent, according to an embodiment of the present invention.

Desktop 905 comprises synchronization software 917 and caching agent with associated persistent store 910. The persistent store is located on high speed rotating magnetic media, accessed via a high bandwidth, for example, 100 MHz at 32 bits wide is 3.2 giga bits per second, bus.

Database "D" 904 is stored on removable media, read by removable media drive 936, which communicates with desktop 905 via communication channel 930, which may have a bandwidth, e.g., of 300 kilo bits per second.

Hand held database "H" 906 resides on a hand held computer linked to desktop 905 via communication link 934, which may be an asynchronous serial cable with a bandwidth of, for example, 230 kilo bits per second.

Server database "S" 902 is connected to desktop 905 via communications channel 932, for example a 100 MHz (100 mega bits per second bandwidth) ethernet network.

In a synchronization in which all databases are present it is straightforward to obtain database information directly from each database in order to update the other databases. For example, to obtain information from database "D" 904 in order to update database "H" 906 and database "S" 902. However, it may be more efficient to retrieve information from caching agent and persistent store 910, according to an embodiment of the present invention. Neglecting latency times for rotating media (which in general may be similar for database "S" and the persistent store on desktop 905, and longer for removable media), information may be accessed from caching agent and persistent store 910 very much faster than any communication requiring a communication channel, for example communication channels 932, 934 and/or 936. Preferably, caching agent and persistent store 910 are "asked" for new information prior to asking individual databases for the same information. It is to be appreciated that if information is obtained from caching agent/persistent store 910, in general a database will not subsequently be asked for the same information.

The Tea Party Manager gets a description of a Tea Party from the Tea Party Scheduler 361 software module. The Tea Party Manager then conducts the Tea Party according to the proper Tea Party Procedure.

To initiate a tea party, the Tea Party Manager contacts each synchronization agent. Each agent responds by indicating whether or not they are willing to attend the Tea Party. If no agents want to attend the party, then the party is cancelled.

Figure 3B:
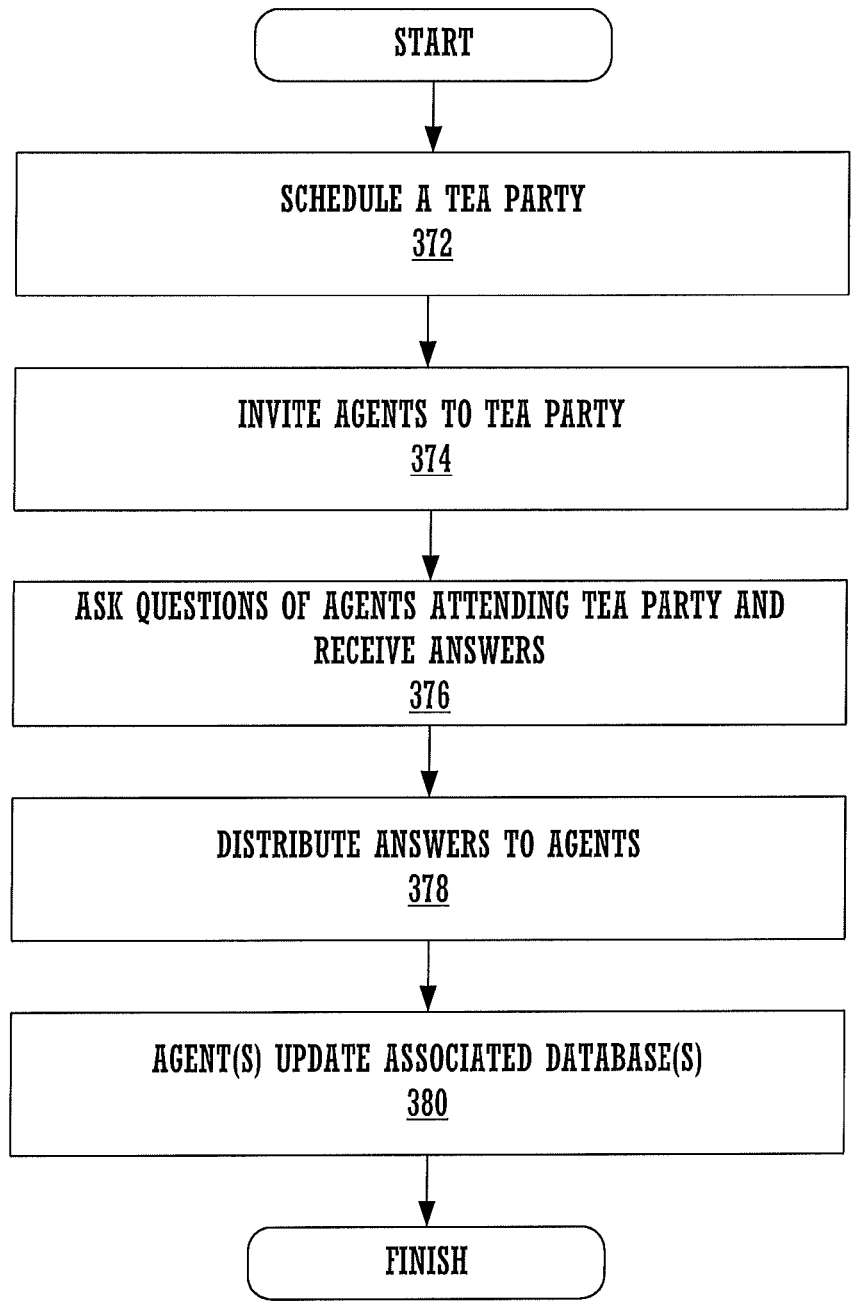
FIG. 3B illustrates a method of synchronizing databases, according to an embodiment of the present invention.

FIG. 3B illustrates a method 370 of synchronizing databases, according to an embodiment of the present invention.

In step 372, a tea party is scheduled. Tea parties can be scheduled for many reasons, e.g., in response to a question received during a previous tea party or in response to a specific event, for example a single from a synchronization cradle.

In step 374, agents are invited to the tea party. In step 376, agents that have indicated a desire to attend the tea party are asked questions as to what questions the agents have for other participants in the tea party, and as to what information the agents can supply. These questions form an agenda for the tea party. As discussed above, the questions take the form of "What does a specific agent know?" and "What does a specific agent want to know?" These questions typically are answered by statements of coverage. For example, a specific agent is able to answer questions (provide information) up to a given coverage, and it requests information beyond that coverage.

In step 376, the questions on the tea party agenda are asked of the agents attending the tea party, and available answers are received.

In step 378, the answers received in step 376 are distributed to the agents of the tea party. In an optimization, the answers may be directed to only the agent asking a question calling for a particular answer.

In step 380, an agent receiving database information updates its associated database.

In addition to agents that synchronize with common databases, for example a calendar or phonebook databases, there may be a number of more specialized agents participating in a synchronization session. These agents are designed to perform special functions, and generally typical application programs do not access their endpoints. In some cases, prior art implementations of such functions required specialized two-ended conduits and specialized databases or endpoints on at least one side of the conduit. In contrast, as described previously, the present single ended synchronization agents communicate with a single database, for example a special database. Unlike the prior art two ended conduits, such agents are not burdened by the complexities of interacting with a second database.

One such specialized synchronization agent is backup agent 172 of FIG. 2. Such an agent may save data to disks, for example floppy disks or compact discs represented by removable media device 176 of FIG. 2, in a form that is partitionable and restorable. Partitionable implies that each dataset should be backed up to a separate disk file. This is to enable data transfer between users by distributing the file. This file should be restorable for any user. A removable storage media include floppy disks or compact discs.

A second type of specialized synchronization agent is restore agent 174 of FIG. 2. A restore agent can be complimentary to a backup agent.

Another specialized synchronization agent is a "handheld agent," for example hand held synchronization agent 160 of FIG. 2. The hand held agent may participate in multiple synchronization sessions for a variety of types of data. As a participant in various synchronization sessions, the handheld agent moves data from a handheld computer to the synchronization engine, and moves information from the synchronization engine to the hand held computer. Because the hand held agent synchronizes all of the handheld-based data with the common synchronization manager, most developers of hand held applications may not have to write handheld code when developing single ended synchronization agents. Developers may only need to create code for moving data between the synchronization engine and their endpoint. In contrast, with the prior art double ended conduits, since one endpoint was a hand held database, developers of hand held applications were required to create a complete conduit.

Yet another special synchronization agent is device information agent 162 of FIG. 2. A device information agent collects the (primarily user selectable) preferences and features of the handheld computer so that they may be accessed later. It may store this data in a disk-based persistent store (not shown) on a desktop computer, and allows access to that information through a set of applications programming interfaces, APIs. It is to be appreciated that device information agent 162 communicates with hand held computer 115 through common synchronization manager 100 and hand held synchronization agent 160.

Install agent 164 of FIG. 2 is a specialized single ended synchronization agent to install code and data onto a hand held computer. Programs and the like may be downloaded, for example, from internet websites onto desk top computer system 105, transferred and loaded onto hand held computer 115 via install agent 164. It is to be appreciated that install agent 164 communicates with hand held computer 115 through common synchronization manager 100 and hand held synchronization agent 160.

A role of a common synchronization engine is to detect and reconcile conflicts, for example records from two or more endpoints that have been modified, such that the reconciliation action will result in a "conflicted" state. Preferably, the conflict should be resolved in the application program that uses the database (e.g., on the handheld computer or on the desktop) since that application is capable of displaying the data to a user. Consequently, identified conflicts may not be resolved during the synchronization session. The resolution may be indefinitely postponed and the conflicted state may be retained.

A specialized conflict resolution agent 184 of FIG. 2 may resolve conflicts according to a set of user-modifiable rules. Such an agent should only resolve conflicts for a dataset when there is no other possibility for resolution.

Another specialized synchronization agent is a "notifier," or notification agent (not shown). This agent notifies application programs that "their" data, e.g., data in a database that the application program manipulates, is undergoing synchronization and should not be changed. A notification agent is typically called prior to and after a synchronization session.

In order to simplify the interface between a common synchronization manager and synchronization agents, it may be convenient to design the interface so that the common synchronization manager can only communicate with a "smart" synchronization agent that "understands" a particular pedigree system and a particular record identification system. In order to communicate and synchronize with databases that do not implement a chosen pedigree and/or record identification system, in accordance with one embodiment of the present invention it may be necessary to utilize an agent "booster."

An agent booster may be constructed through the use of "promoting" application programming interfaces (APIs). The following example of "boosting" the capabilities of an agent/database illustrates some relative shortcomings of some types of databases and how an agent booster may overcome such deficiencies.

Consider a very common type of database, a computer spread sheet e.g., endpoint (spreadsheet) 128 of FIG. 2, such as may be operated on by the "Excel" program, commercially available from Microsoft Corporation of Redmond, Wash. Excel databases (spreadsheets) are quite capable in terms of identifying individual data records, e.g., rows of the spreadsheet. However, typical spreadsheets have no concept of change. For the purposes of synchronization, this lack of a change history is a severe shortcoming, and aligns this type of database with "ignorant" agents/databases.

An agent "booster," for example agent booster 124 of FIG. 2, adds capabilities to the underlying database, such that the combination of the database plus the agent booster are more suitable to synchronization, and compatible with the common synchronization manager interface. In this exemplary case, an agent booster may implement a persistent cache that records the state of the database after a synchronization session. It is to be appreciated that such a cache is separate and distinct from a data cache used by a caching agent, for example caching agent 182 of FIG. 2.

When called to participate in a subsequent synchronization session, the agent booster can compare the present state of the database with the cached version of the database to produce the information changed since the last synchronization. Preferably, an agent booster is able to interact with the database at a relatively low communications cost, since an agent booster will typically exchange more information with a database than is normally required in exchanges between an agent and a synchronization engine.

In this manner, the agent booster may determine differences (e.g., deletions, additions or changes to database records) in the database (farpoint) between a prior synchronization session and the present time, thereby promoting a formerly "ignorant" agent to a "simple" agent. By further maintaining a synchronization clock and a pedigree, the agent booster may report coverage and respond to agenda and query synchronization rounds, thereby promoting a "simple" agent to a "smart" agent. As a result, the agent booster has upgraded the capabilities of the database as seen by a synchronization engine, and the combination is capable of rich synchronization. An agent booster may communicate directly with an endpoint, for example agent booster 124 communicating directly with endpoint 128, or an agent booster may communicate with a less capable agent, for example sync agent 125, that communicates with an associated endpoint. It is appreciated that no changes need be made to the operation or storage formats of the underlying database, in accordance with embodiments of the present invention. It is anticipated that standard booster agents will be made available so that software developers may write agents to interface with ignorant, simple or normal data sources, and use such standard boosters to promote such agents.

Databases with greater pedigree capabilities than "ignorant" agents/databases may also be "boosted" or upgraded. For example, a "simple" agent as described previously, may implement a local cache of its farpoint as described above. A booster for a simple agent may only be required to maintain a synchronization clock and/or pedigree to implement the correct interface to a smart agent. Similarly, a "normal" agent may have a limited capacity to identify changed records from previous synchronization sessions. A booster for this type of agent can maintain a synchronization clock and pedigree, then apply coverage to the change history maintained by the normal agent and its database/farpoint.

It is to be appreciated that many of the typical functions of a synchronization system, e.g., backup, restore, install and application notification, may be performed by specialized agents, according to an embodiment of the present invention. Consequently a synchronization system employing the present synchronization agents can be modular and extensible. This capacity differs significantly from the prior art, which generally is not extensible, or relies on a plurality of different mechanisms to achieve similar extensibility.

Figure 4:
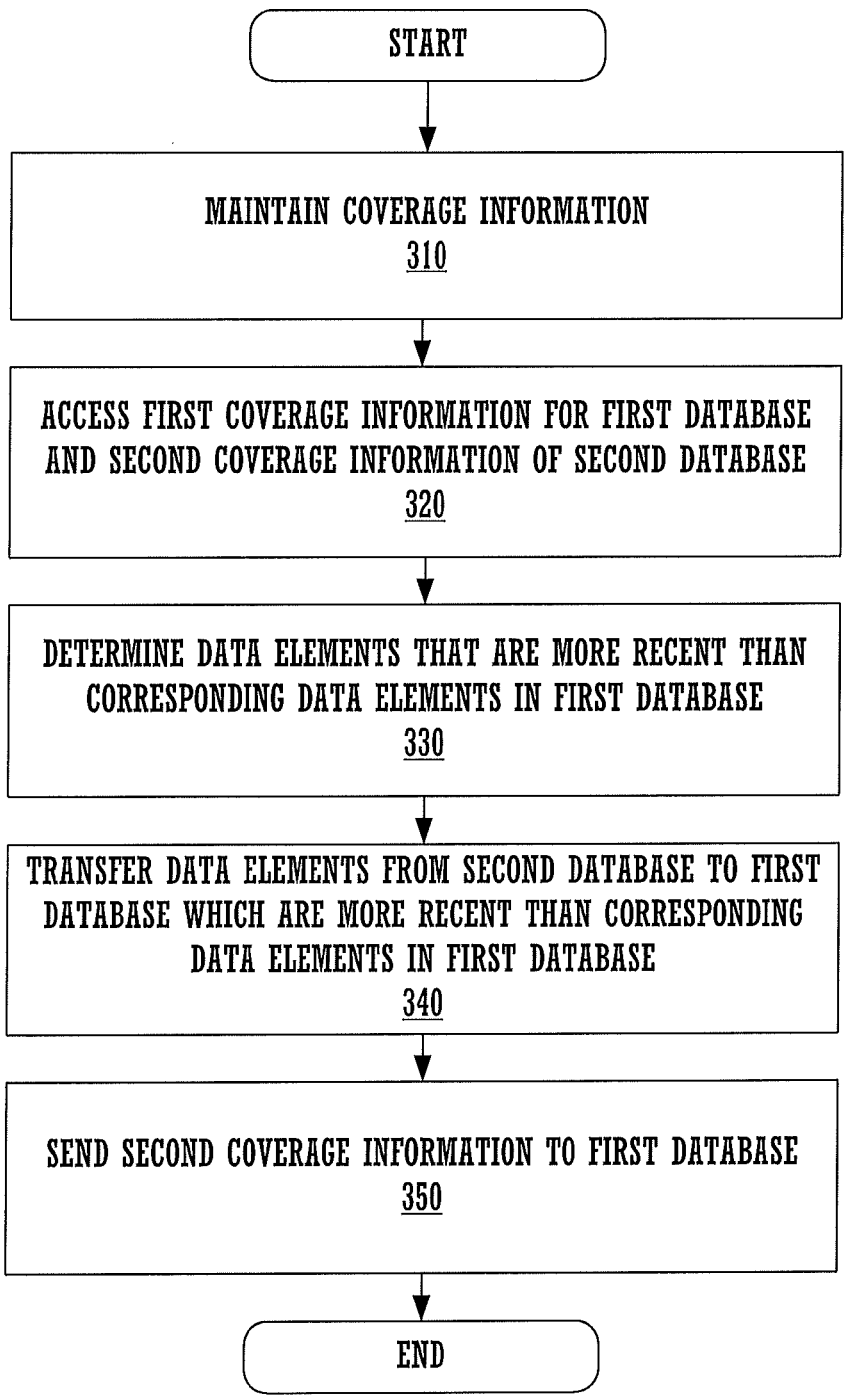
FIG. 4 illustrates a flow chart of a method for a computer implemented method of synchronizing databases, according to an embodiment of the present invention.

FIG. 4 illustrates a flow chart of a method 300 for a computer implemented method of synchronizing databases, according to an embodiment of the present invention.

In optional step 310, an agent program retrieves information from its database that has changed since a last synchronization session.

In step 320 a synchronization engine program accesses first coverage information for a first database and second coverage information of a second database.

In step 330 a synchronization manager asks the synchronization engine the questions received from the first agent (representing the first database). This identifies or determines newer data elements.

In step 340 a synchronization manager program sends the unknown information to the unknowing agent program. Optionally, a synchronization manager program may detect that two or more agents have modified, non-equivalent information for the same record that is unknown to other agents. In this situation, the synchronization manager program may identify such information records as being in conflict prior to providing the new records to all (other than the providing) agents.

In optional step 350, an agent program conveys the (new) information to its endpoint.

In this novel manner, single ended agent programs in cooperation with a common synchronization manager and engine are able to synchronize databases. There are numerous advantages of this method over the prior art, including that the agent programs do not implement synchronization logic and agent programs are required to understand only a single database. These aspects of the novel single ended agent programs greatly simplify the design, construction and maintenance of this software when compared with the prior art. Such improvements in this field may result in greater deployment of higher quality synchronization systems than is currently present in the industry.

According to an embodiment of the present invention, single ended synchronization agents define an interface with a Synchronization Manager ("Sync Manager") and a Synchronization Engine. A Synchronization Manager uses this interface to coordinate, or schedule a synchronization session.

The interface can be viewed as notifications sent by the Synchronization Manager to the agent, however each of these notifications is accomplished by calling a corresponding entry point within the agent. The Synchronization Engine reconciles the data using an internal memory-based cache.

Preferably, the interfaces use handles to access data structures. APIs provide access information given a handle to that data structure. This method abstracts the data in a language-independent manner.

Agents are dynamically loaded by the Sync Manager and are executed by calling into their entry points. Note the difference between a synchronization agent as a dynamically loadable module, and an instance of that module during execution. There is typically only one copy of a particular Agent on the desktop computer, and that copy (the module) is loaded by the Sync Manager. During a synchronization session however, instances of a particular agent may execute many times. For example, an Agent Module may wish to attend multiple synchronization parties, and thus an instance of that Agent will be run for each session. It is also possible to have multiple instances of the same Agent Module attend the same party. This is recommended for Agents whose far point is a standards-based protocol that may be used by different applications. The following two entry points are called by the Sync Manager to interrogate an Agent Module to determine the number of instances and the synchronization sessions they attend.

There may be at least three entry points to an agent, namely "agenda," "query" and "update." According to an embodiment of the present invention, these entry points correspond to "rounds" or phases of a synchronization process.

These three rounds allow an agent to provide and/or receive synchronization information. In the agenda round, an agent inquires of a common synchronization manager for updates to the agent's database. In addition, the agent identifies the database that it represents, and provides information as to the level of information that the database contains. Likewise, the agent also informs the common synchronization manager of the agent's "expertise," for example the information contained within the database. It is frequently the case that the inquiry and expertise contain the same information. For example, a database may generally be able to provide information to a certain level, and request any updates beyond that level. It is to be appreciated, however, that the inquiry and expertise may not contain the same information. For example, an agent representing a database contained on read only media (e.g., a CD-ROM), may describe expertise while making no inquiries, since its database is incapable of storing new information. A data logging agent, for example a program used to make a permanent copy of financial transactions, may appear as "write-only" memory. Such an agent might inquire, e.g., for all information, and profess no expertise.

One method of describing the level of information in a database is by "coverage." Co-pending, commonly owned U.S. patent application Ser. No. 10/159,462 filed May 31, 2002, entitled "Fast Synchronization of Computer Databases Using Coverage Status" discloses a novel system of coverage that is well suited to embodiments of the present invention, and is hereby incorporated herein by reference in its entirety.

It is to be appreciated that other methods of maintaining and describing the level of information in a database are well suited to embodiments of the present invention. Co-pending commonly-owned U.S. patent application Ser. No. 09/710,605, filed Nov. 10, 2000, entitled "Optimized Database Technique to Enable Faster Data Synchronization" to McCaw is hereby incorporated herein by reference in its entirety. U.S. Pat. No. 6,000,000 and U.S. patent application Ser. No. 09/710,605 describe additional methods of maintaining and describing the level of information in a database.

Multiple synchronization agents may provide queries and expertise during an agenda round. After completing an agenda round, a common synchronization engine may determine which database(s) contain updated information. For example, given a list of agent queries and statements of expertise in the form of coverage, a common synchronization engine determines the least upper bound of all coverages. It is to be appreciated that no single database may contain all information necessary to represent a new coverage, and that in general information may be retrieved from more than one database.

Having determined a new coverage, a common synchronization manager accesses database information from source database agents during the query round. In the report round, information is provided to destination database agents in order to bring the databases up to the new coverage level.

Figure 5:
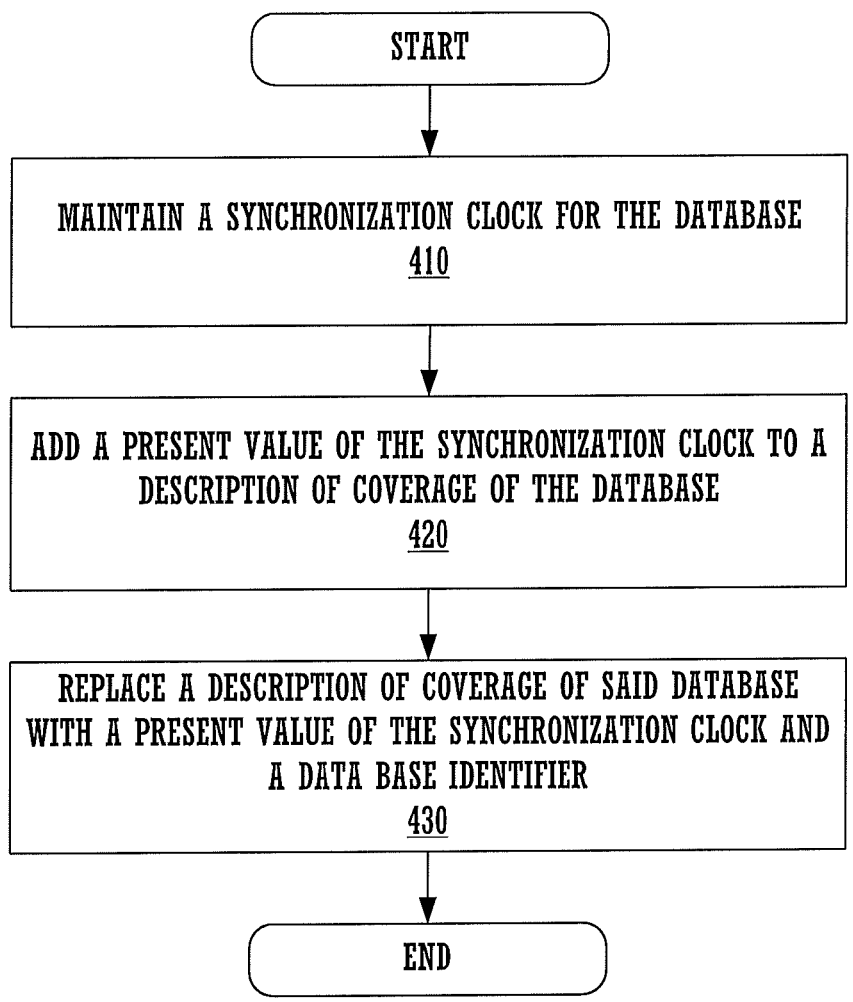
FIG. 5 is a flow chart illustrating a method of single ended synchronization agents communicating with a common synchronization manager, according to an embodiment of the present invention.

FIG. 5 is a flow chart that illustrates a computer implemented method 400 of indicating coverage of a database, according to an embodiment of the present invention.

In step 410, a synchronization clock is maintained for the database. The synchronization clock may be unique to the database, or multiple databases may utilize a single synchronization clock. According to an embodiment of the present invention, the synchronization clock may be a monotonic sequence of symbols, for example a count of integers which only increases. As described previously, a synchronization clock should be advanced to the next symbol, e.g., to the next number, when the database is synchronized. An alternative method is to advance the synchronization clock only when data is changed for the first time following a synchronization.

In step 420, the present value of the synchronization clock is added to a description of coverage of the database in response to a change to a data element of the database. For example, if record number 27 of database D is modified while the D synchronization clock is at 81, then "D:81" may be added to the coverage of database D. It is appreciated that the pedigree of record 27 may also be updated using the synchronization clock to reflect the modification.

In optional step 430, a description of coverage of the database may be replaced with a present value of the synchronization clock and a database identifier. For example, building upon the previous example, prior to the modification of record 27, the coverage of database D may have been "T20B36D80." Step 420 above may have modified the coverage to produce "T20B36D80D81." The present step may replace a previous coverage of the database (D) with the present value of the synchronization clock and database identifier. This may simplify the new coverage to "T20B36D81" as the replaced value may be redundant. Including this step in a method may improve the storage and transmission requirements associate with database coverage.

Figure 6:
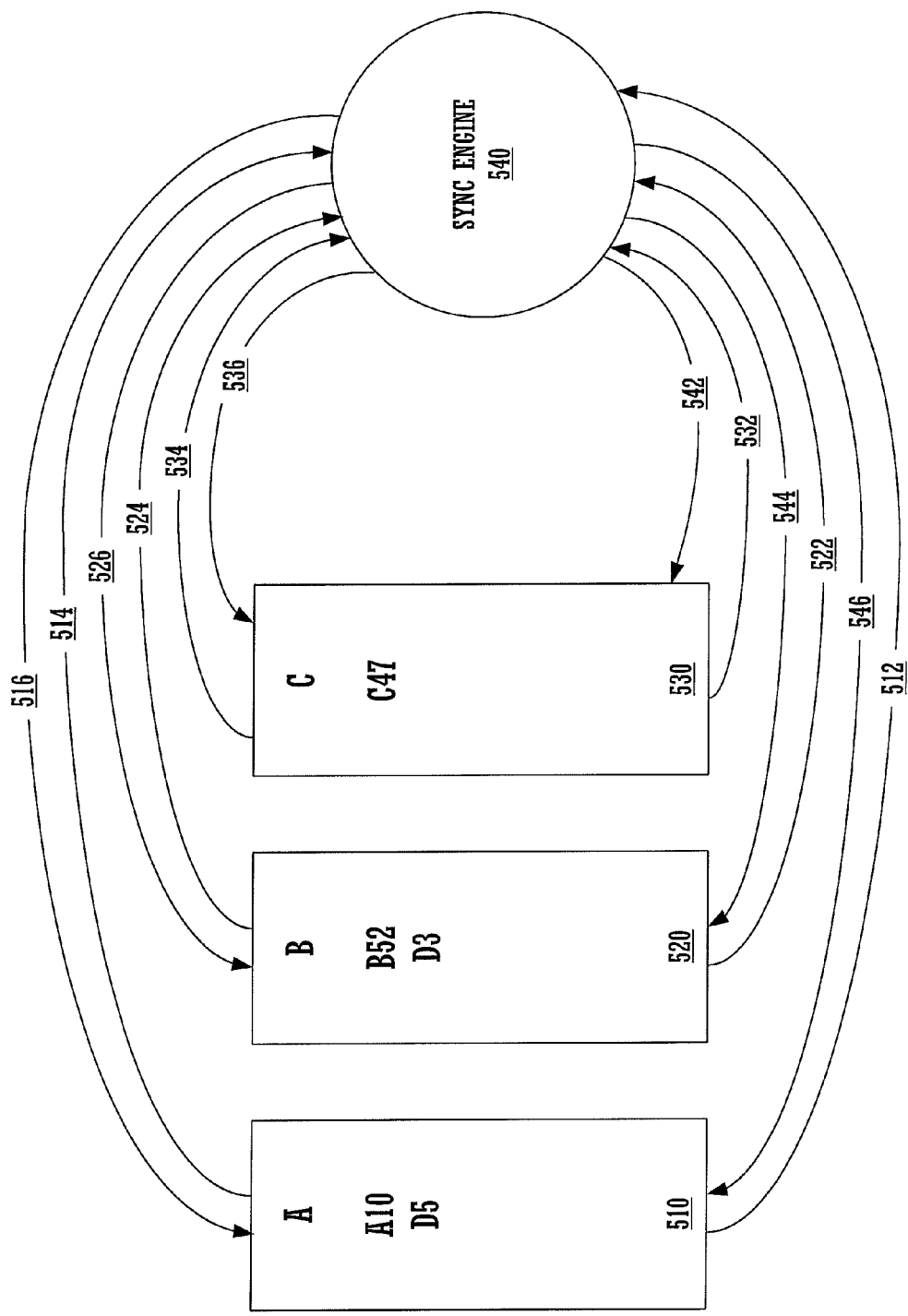
FIG. 6 is a data flow diagram illustrating three phases of synchronization, according to an embodiment of the present invention.

FIG. 6 is a data flow diagram illustrating three phases of synchronization, according to an embodiment of the present invention. Single ended synchronization agents A 510, B 520 and C 530 are functionally coupled to common synchronization engine 540. For purposes of clarity, the databases associated with synchronization agents 510 through 530 are not shown. It is to be appreciated that in general agents "represent" an associated database and generally do not store persistent data themselves. Further, a common synchronization manager is not shown. It is appreciated that agents do not communicate directly with common synchronization engine 540, rather the actual path of the communication is through a common synchronization manager (not shown), according to an embodiment of the present invention.

The coverage of each associated database is shown within the agent box of FIG. 6. More specifically, the database ("database A) associated with agent A 510 is shown as having coverage "A10D5," database/agent B 520 is shown having coverage "B52D3" and database/agent C is depicted having coverage "C47."

During an agenda round of synchronization, agent A 510 sends coverage information 512 ("A10D5") to common synchronization engine 540. In similar manners, agent B 520 sends coverage 522 ("B52D3") and agent C 530 sends coverage 532 ("C47") to common synchronization engine 540.

Common synchronization engine 540 determines maximum coverage, source(s) of database information corresponding to the maximum coverage, and the information needed by each database to bring its coverage to the maximum level. Optionally, common synchronization engine 540 may determine the minimum (or delta) information needed by each database to bring its coverage to the maximum level. For example, using the exemplary coverages of FIG. 6, the maximum coverage is "A10B52C47D5." This is determined by combining the coverage of each database and simplifying any duplicate database identifiers. For example, both database A and database B have information from database D. Database A's information has a higher coverage with respect to database D. Consequently, its coverage supercedes the coverage of database B.

During a query round, common synchronization engine 540 inquires of the agents/databases for the actual database information represented by the coverage, or the delta information needed to update a database to the maximum coverage. For example, inquiry 546 asks agent A 510 to provide all "A" type records and all "D" type records, since no other database present has "A type records. Although database "B has some "D" type records, it requires updates to bring it to coverage level "D5." In addition, database "C" has no "D" type records, and consequently needs them all.

Similarly, inquiry 544 asks agent B 520 to provide all "B" type records, since no other database present has "B" type records. As noted above, agent "B" 520 may not be asked for type "D" records.

Inquiry 542 asks agent C 530 for all "C" type records, since no other database present has "C" type records.

As a second portion of the query round, the agents send the requested information to common synchronization engine 540. For example, information transmittal 514 sends all "A" type records and all "D" type records from database/agent A 510 to common synchronization engine 540. Likewise, information transmittal 524 sends all "B" type records from database/agent B 520, and information transmittal 534 sends all "C" type records from database/agent C 530.

In the report or update round, common synchronization engine 540 redistributes the information records to the agents/databases that need the information. For example, update information 536 sends all "A," "B," and "D" records to agent "C" 530. Likewise update information 516 sends all "B" and "C" information to agent A 510.

Update information 526 sends all "A" and "C" information to agent B 520. However, common synchronization engine 540 may only send records of type D4 and D5 to agent B 520, since database B has previously indicated that it has D type records through coverage level D3. Sending only the difference or delta information optimizes the amount of information transferred. Such optimizations may be important for communication channels, such as wireless links, which have a relatively high communication cost or are otherwise bandwidth limited. It is to be appreciated that synchronization agents subsequently update their respective databases.

Figure 7:
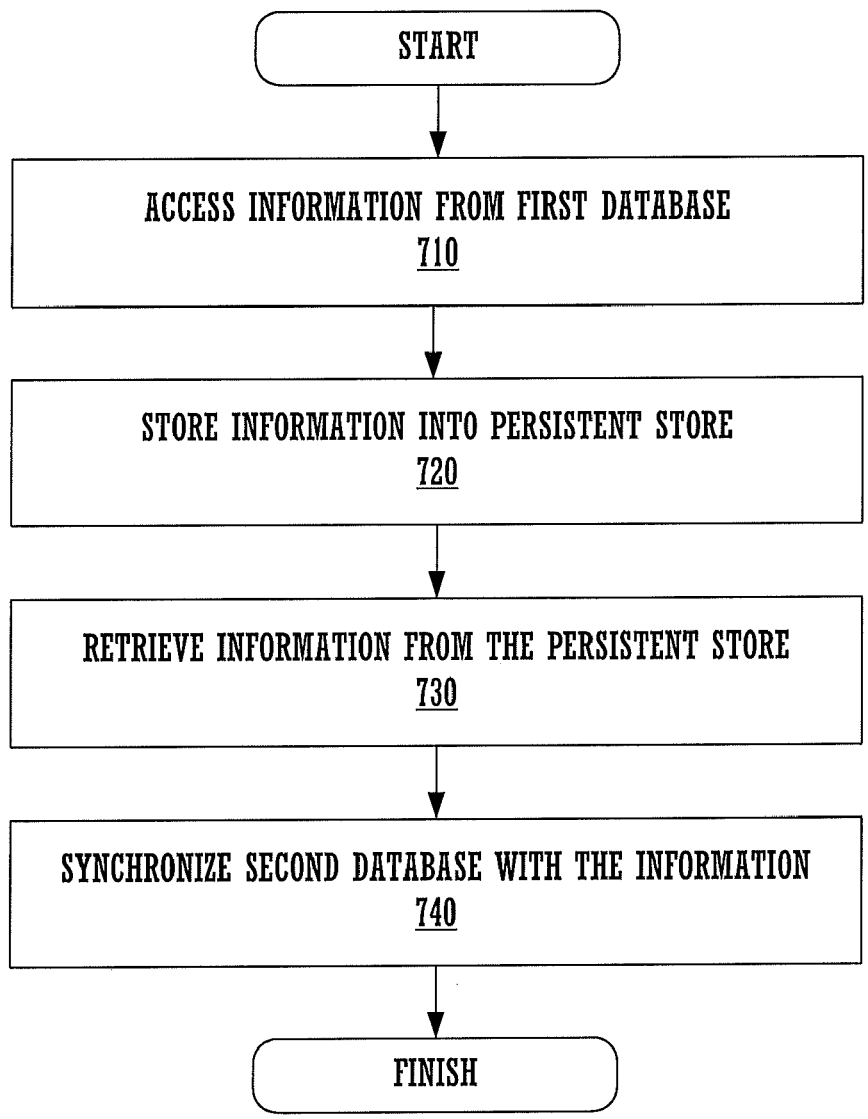
FIG. 7 is a flow chart of a process for a method of synchronizing database information, according to an embodiment of the present invention.

FIG. 7 is a flow chart of a process 700 for a method of synchronizing database information, according to an embodiment of the present invention. In step 710, information from a first database is accessed, for example, by a synchronization manager during a first synchronization. It is appreciated that generally the information may be accessed by an agent associated with that database, and that the agent forwards the information to a synchronization manager.

In step 720, the information is stored into a persistent store, for example by a caching agent present during the first synchronization. In step 730, the information is retrieved from the persistent store via the caching agent. It is to be appreciated that the retrieval may occur with a varying time relationship to the storing of step 720. For example, retrieval may occur soon after the storing, e.g., during the same synchronization session, which may have multiple rounds, in which the information was stored. On the other hand, the retrieval may occur at a substantially different time from the storage, e.g., during a subsequent synchronization session. The first database may or may not be accessible when the retrieving occurs. In one scenario, the retrieving takes place during a subsequent synchronization in which the first database is not participating and therefore not available to the second database.

If the first database is not accessible, then the function of the caching agent may enable synchronization with information from the first database when synchronization with the first database otherwise may not have been possible. If the first database is accessible, as discussed above, it will typically be more efficient to retrieve the information from a cache via a caching agent than to access the information from the first database.

In step 740, the information obtained via the caching agent is used to synchronize a second database. In this novel manner, synchronization of computer databases is improved. In a case in which a database is not available, embodiments of the present invention may allow synchronization when synchronization typically would not have been possible under the prior art. In a case in which a database is available, embodiments of the present invention may realize increased efficiency in synchronization.

Figure 8:
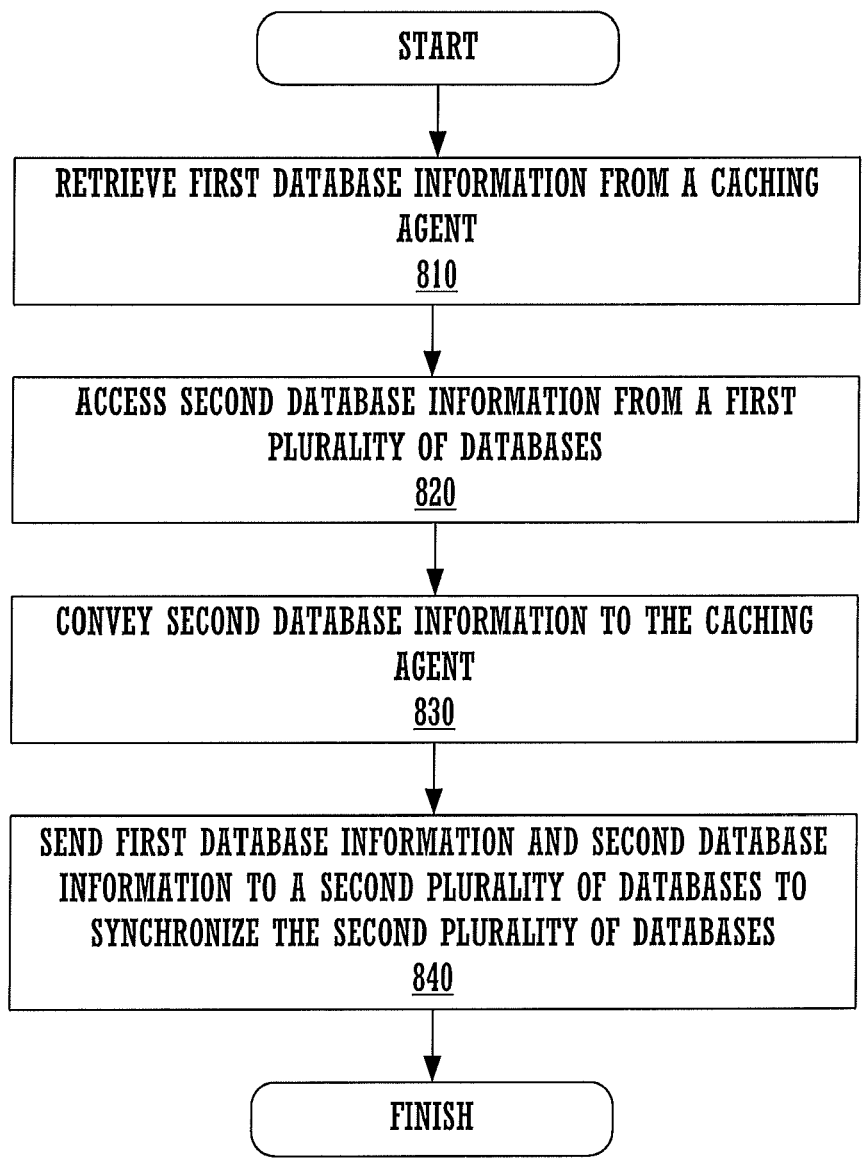
FIG. 8 is a flow chart of a process for a method of synchronizing database information, according to an embodiment of the present invention.

FIG. 8 is a flow chart of a process 800 for a method of synchronizing database information, according to an embodiment of the present invention.

In step 810, first database information is retrieved from a caching agent. It is appreciated that the caching agent will typically retrieve the information from a persistent store.

In step 820, second database information is accessed from a first plurality of databases. Preferably, knowledge of the information obtained via the caching agent is used to limit the databases inquired of, and/or to limit the information sought from the first plurality of databases. In general, it is not necessary to obtain any element of first database information a subsequent time.

In step 830, second database information is conveyed to the caching agent. It is to be appreciated that the caching agent will typically store the information in a persistent store. In this manner, new information may be added to the persistent store for possible use in subsequent synchronization sessions.

In step 840, first database information and second database information is sent to a second plurality of databases so that the second plurality of databases may be synchronized.

Figure 10:
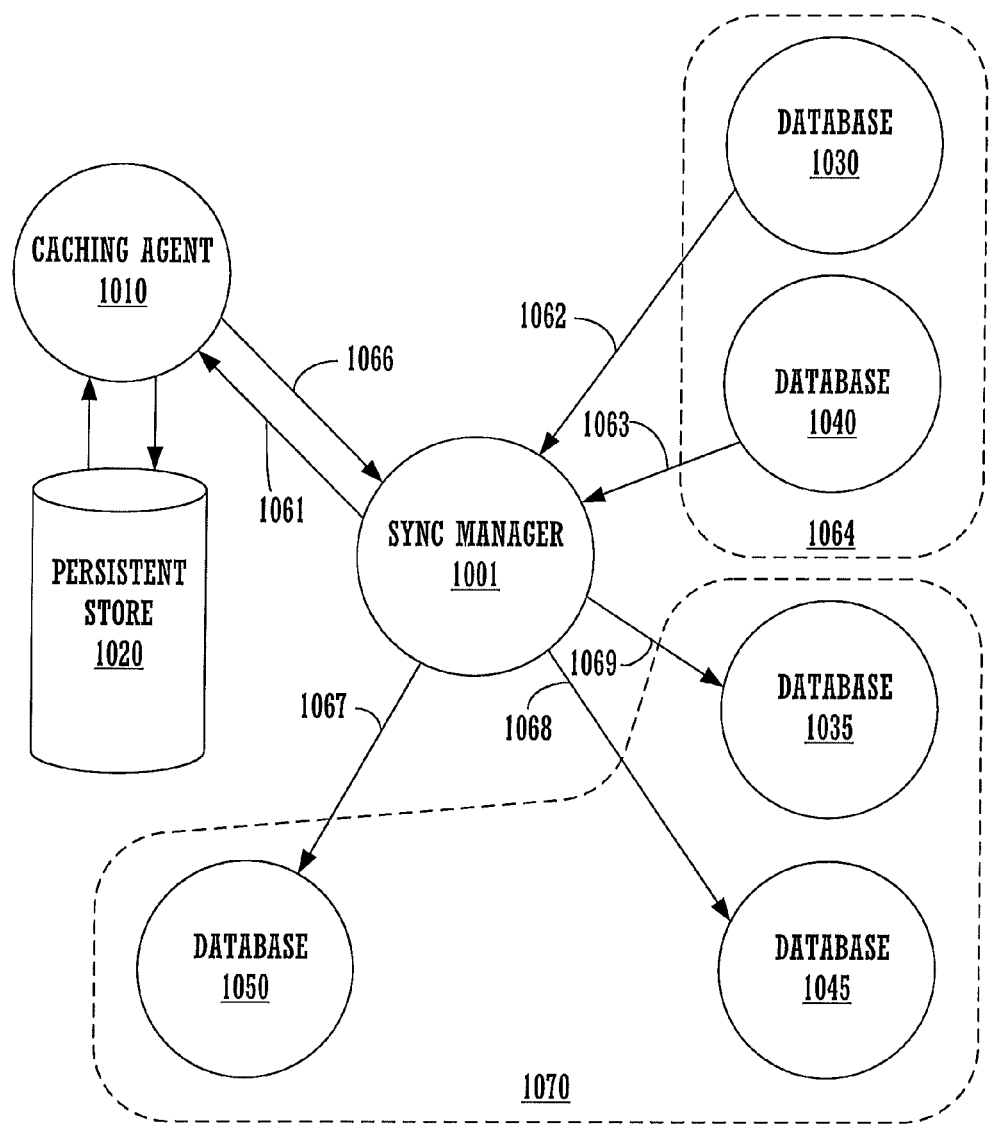
FIG. 10 illustrates an exemplary data flow of a method of synchronizing database information, according to an embodiment of the present invention.

FIG. 10 illustrates an exemplary data flow of a method of synchronizing database information, according to an embodiment of the present invention.

Caching agent 1010 manages information storage and retrieval to persistent store 1020. Synchronization manager software 1001 coordinates data transfers among database agents. Database 1030 and database 1040 comprise a first plurality of databases 1064. Databases 1035, 1045 and 1050 comprise a second plurality of databases 1070. For clarity, the agents associated with databases 1030, 1035, 1040, 1045 and 1050 are not shown. It is appreciated that an associated database agent typically manages synchronization data to and from a database.

Dataflow 1066 shows first database information being retrieved from caching agent 1010. Dataflows 1062 and 1063 depict second database information being accessed from first plurality of databases 1064. As a beneficial result of the contents of first database information, it may not have been necessary to query a database, for example database 1035, for second database information.

With dataflow 1061, second database information is conveyed to caching agent 1010 to be stored in persistent store 1020. Dataflows 1067, 1068 and 1069 depict first database information and second database information being sent to second plurality of databases 1070.

The preferred embodiment of the present invention, synchronization of computer databases using caching agents, is thus described. While the present invention has been described in particular embodiments, it should be appreciated that the present invention should not be construed as limited by such embodiments, but rather construed according to the below claims.

What is claimed is:

1. A computer device for synchronization between databases, the device comprising:
    a first interface for impermanently communicating with a remote server on which a first database is maintained;
    a second interface for communicating with a removable media device on which a second database is maintained;
    a third interface for communicating with an external computer device on which a third database is maintained;
    a memory associated with the first, second, and third interfaces;
    a synchronization agent configured to execute synchronization among the first, second and third databases; and
    a caching agent associated with a persistent store, the caching agent monitors the synchronization among the first, second and third databases to store any new information,
    wherein, if all databases are present, the synchronization agent obtains information directly from each database of the first, second and third databases in order to update other database, and if the computer device and the external computer device are connected with each other and the removable media device is not removed from the computer device and the computer device is unable to communicate with the first database, the synchronization agent executes synchronization between the second and third databases and the caching agent monitors the synchronization between the second and third databases to store the new information into the persistent store, and if the computer device is able to communicate with the first database when the removable media device has been removed from the computer device, the caching agent supplies the new information stored on the persistent store to the first database on the server, wherein the synchronization between the second and third databases further comprises accessing coverage information for the first database and coverage information for the second database, wherein the coverage information for the first database and the coverage information for the second database are accessed at a different time from when the synchronization among the first, second and third databases occurred and replacing a description of coverage of the third database with a present value of synchronization clock and a database identifier.

2. The computer device of claim 1, wherein the computer device is selected from the group of desktop computer, notebook PC, television, and smart phone device.

3. The computer device of claim 1, wherein the external computer device is selected from the group of desktop computer, notebook personal computer, television, portable computing device, digital camera, portable music player and smart phone device.

4. The computer device of claim 1, wherein the caching agent is single ended.

5. The computer implemented method of claim 1, wherein a caching agent associated with a device performs determining new data items and storing the data items.

6. The computer implemented method of claim 5, wherein the caching agent is single ended.

7. The computer implemented method of claim 1, wherein a synchronization agent associated with a device controls first synchronization process and second synchronization process.

8. A computer implemented method for synchronizing databases, the method comprising the steps of:
    impermanently communicating, via a first interface, with a remote server on which a first database is maintained;
    communicating, via a second interface, with a removable media device on which a second database is maintained;
    communicating, via a third interface, with an external computer device on which a third database is maintained;
    associating a memory with the first, second, and third interfaces;
    synchronizing, by using a synchronization agent, among the first, second and third databases; and
    associating a caching agent with a persistent store;
    monitoring, by using the caching agent, the synchronization among the first, second and third databases to store any new information,
    wherein, if all databases are present, the synchronization agent obtains information directly from each database of the first, second and third databases in order to update other database, and if a computer device and the external computer device are connected with each other and the removable media device is not removed from the computer device and the computer device is unable to communicate with the first database, the synchronization agent executes synchronization between the second and third databases and the caching agent monitors the synchronization between the second and third databases to store the new information into the persistent store, and if the computer device is able to communicate with the first database when the removable media device has been removed from the computer device, the caching agent supplies the new information stored on the persistent store to the first database on the server, wherein the synchronization between the second and third databases further comprises accessing coverage information for the first database and coverage information for the second database, wherein the coverage information for the first database and the coverage information for the second database are accessed at a different time from when the synchronization among the first, second and third databases occurred and replacing a description of coverage of the third database with a present value of synchronization clock and a database identifier.

9. A removable storage media connected to a computer device storing instructions for controlling the instructions associated with a synchronization agent software module that is executed on a programmed device, the instructions comprising:

impermanently communicating, via a first interface, with a remote server on which a first database is maintained;

communicating, via a second interface, with a removable media device on which a second database is maintained;

communicating, via a third interface, with an external computer device on which a third database is maintained;

associating a memory with the first, second, and third interfaces;

synchronizing, by using a synchronization agent, among the first, second and third databases; and associating a caching agent with a persistent store;

monitoring, by using the caching agent, the synchronization among the first, second and third databases to store any new information, wherein, if all databases are present, the synchronization agent obtains information directly from each database of the first, second and third databases in order to update other database, and if the computer device and the external computer device are connected with each other and the removable media device is not removed from the computer device and the computer device is unable to communicate with the first database, the synchronization agent executes synchronization between the second and third databases and the caching agent monitors the synchronization between the second and third databases to store the new information into the persistent store, and if the computer device is able to communicate with the first database when the removable media device has been removed from the computer device, the caching agent supplies the new information stored on the persistent store to the first database on the server, wherein the synchronization between the second and third databases further comprises accessing coverage information for the first database and coverage information for the second database, wherein the coverage information for the first database and the coverage information for the second database are accessed at a different time from when the synchronization among the first, second and third databases occurred and replacing a description of coverage of the third database with a present value of synchronization clock and a database identifier.

10. The computer implemented method of claim 9, further comprising instructions for a caching agent that performs determining new data items and storing the data items.

11. The computer implemented method of claim 10, wherein the caching agent is single ended.

12. The computer implemented method of claim 9, wherein the synchronization agent controls first synchronization process and second synchronization process.

* * * * *